(12) United States Patent
Bosmans (10) Patent No.: US 12,543,769 B2
(45) Date of Patent: Feb. 10, 2026

(54) ROASTING SYSTEM

(71) Applicant: LA BOMBA SPRL, Hamme-Mille (BE)

(72) Inventor: Koen Bosmans, Nodebais (BE)

(73) Assignee: LA BOMBA SPRL, Hamme-Mille (BE)

( * ) Notice: Subject to any disclaimer, the term of this patent is extended or adjusted under 35 U.S.C. 154(b) by 1011 days.

(21) Appl. No.: 17/640,082

(22) PCT Filed: Sep. 3, 2020

(86) PCT No.: PCT/EP2020/074627
§ 371 (c)(1),
(2) Date: Mar. 3, 2022

(87) PCT Pub. No.: WO2021/043915
PCT Pub. Date: Mar. 11, 2021

(65) Prior Publication Data
US 2022/0322722 A1 Oct. 13, 2022

(30) Foreign Application Priority Data
Sep. 6, 2019 (BE) .................................. 2019/5590

(51) Int. Cl.
*A23N 12/12* (2006.01)
*H02S 40/38* (2014.01)

(52) U.S. Cl.
CPC ............ *A23N 12/125* (2013.01); *H02S 40/38* (2014.12)

(58) Field of Classification Search
CPC .. H05B 6/6411; H05B 6/6455; H05B 6/6473; H05B 6/707; H05B 6/80; A23L 5/34
(Continued)

(56) References Cited

U.S. PATENT DOCUMENTS

| 6,922,908 B1 * | 8/2005 | Raudales ................ F26B 9/066 |
| | | 126/714 |
| 2007/0033828 A1 * | 2/2007 | Hartkop ................. A23N 12/08 |
| | | 34/245 |

(Continued)

FOREIGN PATENT DOCUMENTS

| CN | 103987282 A | 8/2014 |
| CN | 105520165 A | 4/2016 |

(Continued)

OTHER PUBLICATIONS

Li, CN 201878735 (Year: 2018).*

(Continued)

*Primary Examiner* — Vy T Nguyen
(74) *Attorney, Agent, or Firm* — KDW Firm PLLC (57) ABSTRACT

A system for roasting particulate material, such as coffee or cacao beans, grains, or malt, includes a photovoltaic unit configured for generating electricity from the solar radiation, a heat storage device comprising at least one phase change material, a roasting device configured for roasting said particulate material, a thermal circuit connecting the heat storage device to the roasting device and configured for circulating a fluid through the roasting device, and an electrical circuit connecting the photovoltaic unit to the heat storage device and configured for exchanging heat with said at least one phase change material.

19 Claims, 6 Drawing Sheets

(58) Field of Classification Search
USPC .................................. 126/634, 714; 99/286
See application file for complete search history.

(56) References Cited

U.S. PATENT DOCUMENTS

2016/0120211 A1    5/2016   Wilson
2016/0295906 A1    10/2016  Jacobsen et al.
2023/0117149 A1    4/2023   Sachs

FOREIGN PATENT DOCUMENTS

| CN | 107087805 A | 8/2017 |
| CN | 108157488 A | 6/2018 |
| CO | 92302009    | 2/1991 |
| FR | 2034067 A5  | 12/1970 |

OTHER PUBLICATIONS

International Search Report and Written Opinion for the International Patent Application No. PCT/EP2020/074627, mailed Nov. 16, 2020, 10 pages.

\* cited by examiner

ROASTING SYSTEM

This application is a national stage filing under 35 U.S.C. 371 of pending International Application No. PCT/EP2020/074627, filed Sep. 3, 2020, which claims priority to Belgian Patent Application No. BE2019/5590, filed Sep. 6, 2019, the entirety of which applications are incorporated by reference herein.

FIELD OF THE INVENTION

The present invention relates to a roasting system for particulate material, such as coffee or cacao beans, grains, malt.

BACKGROUND OF THE INVENTION

Although the roasting of particulate material, such as cacao or coffee beans, is undertaken in large industrial installations, it remains an extremely delicate operation, requiring a particular expertise. The chemical composition of the material changes during roasting: its appearance, as well as the development of flavours and tastes, evolves during this operation. In addition, on contact with heat some elements disappear, while others combine.

According to known solutions in the industry, roasting takes place in a circular or cylindrical grill, called a roaster. This is a device equipped with a permanently rotating drum so that the material, always in motion, is roasted uniformly and without being burned. The heat source must be regulated because the reactions evolve during roasting. At the end of the operation, the material must be cooled rapidly to interrupt the chemical processes. During roasting, the particulate material must reach a uniform temperature within itself, in order to obtain the best possible quality. Some techniques are distinguished by their duration and by the amount of heat used. The traditional method operates at low temperature for a long time, which entails a small production quantity but the achievement of the best quality. In contrast, industrial processes that enable more rapid production speeds are generally carried out at higher temperatures, with the result that a portion of the material will be burned, releasing less refined flavours.

At present, energy is not used optimally in roasting devices, and numerous losses can be highlighted, for example by considering an open system with emissions of roasting gas and/or steam to the outside of this system. In addition, the energy consumption can prove to be substantial when it involves industrial processes operating at high temperature. Emissions treatment installations are not optimally regulated and operate at high power levels, which can have an impact on the environment.

SUMMARY

The purpose of the embodiments of the invention is to propose a roasting system for particulate material capable of being implemented industrially at high production rates, and comprising efficient energy generation and storage with the lowest volume and cost.

A system is proposed for roasting particulate material, such as coffee or cacao beans, grains, malt. The system comprises a photovoltaic unit configured for generating electricity from solar radiation, a heat storage device comprising at least one phase change material, a roasting device configured for roasting said particulate material, a thermal circuit connecting the heat storage device to the roasting device and configured for circulating a fluid through the roasting device, and an electrical circuit connecting the photovoltaic unit to the heat storage device and configured for exchanging heat with said at least one phase change material.

The system is thus based on a clean and renewable energy source, avoiding the use of fossil fuel in order to reduce carbon emissions, a heat storage device deriving from this source, and a roasting device supplied by the heat produced and/or stored. The electrical circuit ensures the supply of electricity to the heat storage device and the heat exchange with said at least one phase change material. The thermal circuit itself ensures the delivery of a flow of heat coming from a fluid circulating therein to the roasting device, as well as an exchange of heat and/or material between this fluid and the roasting device.

In view of future energy challenges, the development of sustainable energy sources is becoming more and more topical. However, because these energies are delivered inconsistently, their development is closely linked to that of adequate energy storage systems. Thus, the photovoltaic unit and heat storage device enable the generation of energy on demand, and not only when the sunlight is sufficient. The photovoltaic unit converts solar energy into electrical energy. In addition, the heat storage device enables the storage of thermal energy, that can be used to heat the fluid circulating in the thermal circuit. Among the existing technologies for storing thermal energy, the storage of latent heat through the use of phase change materials proves to be a solution of interest since it can lead to reduced storage size and to high temperature. Phase change materials are materials capable of undergoing a phase transition at a constant temperature. Energy storage and release takes place during these phase change processes, and the amount of energy corresponds to their latent heat, which is relatively high compared to sensible heat storage systems.

According to an exemplary embodiment, the photovoltaic unit comprises at least one photovoltaic panel. Said at least one photovoltaic panel is typically composed of photovoltaic cells that use the photoelectric effect to convert the electromagnetic waves (radiation) emitted by the Sun into electricity. Several photovoltaic cells connected together typically form a photovoltaic panel, and several photovoltaic panels grouped together typically form a photovoltaic unit as described above.

According to a preferred embodiment, the electrical circuit comprises at least one electrical resistance in thermal contact with said at least one phase change material, and a first electrical branch connecting the photovoltaic unit to said at least one electrical resistance. In the event of direct thermal contact with said at least one phase change material, said at least one electrical resistance can comprise a protective sheath that surrounds it and is made of a heat conductive material, said sheath being in direct thermal contact with said at least one phase change material.

According to a preferred embodiment, the thermal circuit comprises a first thermal branch passing through the heat storage device.

According to a preferred embodiment, the thermal circuit comprises a second thermal branch parallel to the first thermal branch, and the electrical circuit comprises at least one electrical resistance in contact with the second thermal branch, and a second electrical branch connecting the photovoltaic unit to said at least one electrical resistance.

Thus, during the day and when the sunlight is sufficient, the fluid can circulate in the second thermal branch and be heated by said at least one electrical resistance in contact with the second thermal branch. Indeed, in this case the photovoltaic unit produces sufficient electrical energy for supplying said at least one electrical resistance, and a portion of this electrical energy can supply it. In addition, another portion of the electrical energy produced by the photovoltaic unit can supply said at least one electrical resistance in thermal contact with said at least one phase change material in such a way as to melt it. In this way, the latter enables the storage and release of energy in thermal form. During the night or when the sunlight is insufficient, the fluid can circulate in the first thermal branch and be heated by the heat storage device. In this case the photovoltaic unit does not produce sufficient electrical energy for supplying said at least one electrical resistance in contact with the second thermal branch. In this way, during the day, the photovoltaic unit can be configured for producing electrical energy corresponding to 100% of the energy consumed in 24 hours by the roasting system.

According to a preferred embodiment, the roasting device comprises a treatment compartment configured for receiving the particulate material, and at least one generation unit configured for generating at least one gas and/or steam flow with a controlled temperature through the treatment compartment. Said at least one generation unit is configured for exchanging heat between the fluid and said at least one gas and/or steam flow, or for directly using the fluid for generating said at least one gas and/or steam flow.

Therefore, it is possible to dispense with the use of thermal oil, as in thermal solar installations comprising for example concentrated solar collectors. Indeed, thermal oil can be flammable, and cannot be in direct contact with the particulate material to be roasted. Thermal oil enables the use of heat exchangers, but does not enable direct exchange of material between the thermal circuit and the roasting device.

According to an exemplary embodiment, the fluid is composed of gas and/or steam.

Indeed, a gas like air, or a steam like water vapour, has calorific capacities of interest for the development of an industrial installation.

According to a preferred embodiment, the roasting system comprises an electrical battery configured for storing a portion of the electricity generated by the photovoltaic unit.

Thus, the photovoltaic unit converts solar energy into electrical energy and can store a portion of this electrical energy in the electrical battery. Compared with a solution exclusively using electrical batteries for storing the energy produced by the photovoltaic unit, embodiments involving an electrical battery and a heat storage device enable a reduction of the cost of storing solar energy by a factor of three, and enable a reduction of the storage volume of solar energy by a factor of two.

The photovoltaic unit and/or the electrical battery can also supply electrical or electromechanical devices such as motors, pumps, fans, and/or electronic devices such as control systems for the various components of the roasting system. Thus, during the day and when the sunlight is sufficient, the photovoltaic unit can supply said devices and charge the electrical battery, and during the night or when the sunlight is insufficient, the electrical battery can supply said devices.

According to a preferred embodiment, the electrical circuit comprises control means configured for controlling the flow of the electricity generated by the photovoltaic unit in the first electrical branch and in the second electrical branch.

According to a preferred embodiment, the thermal circuit comprises control means configured for controlling the flow of the fluid in the first thermal branch and in the second thermal branch.

According to an exemplary embodiment, the roasting system is configured for allocating between 25% and 75% of the electricity generated by the photovoltaic unit to said at least one electrical resistance in thermal contact with said at least one phase change material, between 25% and 75% of said electricity to said at least one electrical resistance in contact with the second thermal branch, and between 0% and 10% of said electricity to said electrical battery.

Thus, a lesser amount of said electricity can be allocated to the electrical battery used to supply said electrical and electromechanical devices and/or said electronic devices, with most of the consumption of electrical energy generated by the photovoltaic unit coming from the aforementioned electrical resistances.

According to a preferred embodiment, the photovoltaic unit and the heat storage device are configured for operating in a range of temperatures between 150° C. and 350° C., preferably between 200° C. and 300° C.

In this way, a quality of particulate material is obtained that is comparable to that obtained with a traditional roasting method. This range of temperatures also enables reduction of the consumption of thermal energy while still ensuring this quality. Thus, embodiments aim to propose a roasting system for particulate material capable of being implemented industrially and of operating at low temperature in order to obtain a better quality roasted material, with low energy consumption, and at high production rates.

According to an exemplary embodiment, said at least one electrical resistance in thermal contact with said at least one phase change material comprises at least two electrical resistances arranged in parallel or in series. In addition or alternatively, the first thermal branch comprises at least two thermal sub-branches arranged in parallel inside the heat storage device.

Thus, the first thermal branch can branch out into several parallel thermal sub-branches in order to increase the heat exchange between said at least one phase change material and the thermal sub-branches. Said at least two electrical resistances and/or said at least two thermal sub-branches can be provided with fins on their external surface for optimising the thermal exchange with said at least one phase change material.

According to an exemplary embodiment, said at least one phase change material comprises an upstream material and a downstream material in the circulation direction of the fluid. Preferably, the melting temperature of the upstream material is lower than the melting temperature of the downstream material. Preferably, the solidification temperature of the upstream material is lower than the solidification temperature of the downstream material.

In this way, if the incident light intensity is weak, at least a portion of the heat storage device is in the liquid state and enables the release of energy used for the roasting device. This configuration involving different phase change materials arranged in layers has a higher volumetric energy efficiency than a configuration involving only one phase change material.

According to an exemplary embodiment, said at least one phase change material comprises any one or more of the following materials: organic material such as paraffin or fatty acids, potassium-acetate or sodium-acetate combination, eutectic mixture of molten salts such as potassium chloride and lithium bromide, metals and their alloys, hydrated salts.

According to a preferred embodiment, the thermal circuit comprises a first generation branch and a second generation branch, a first valve in the first generation branch and a second valve in the second generation branch, and a pump unit configured for pumping the fluid through the first generation branch and the second generation branch. Said at least one generation unit comprises a first generation unit coupled with the first generation branch and a second generation unit coupled with the second generation branch, a first heat exchanger in the first generation unit and a second heat exchanger heat in the second generation unit.

Thus, the valve device enabling the regulation of the temperature of the gas and/or steam flow in the generation units enables the use of just one pump. For regulating these temperatures, the valves can open more and more until reaching a certain percentage of the maximum opening capacity. Beyond this value, the pump can start to pump more for regulating said temperatures.

According to a preferred embodiment, a generation unit of said at least one generation unit comprises a heat exchanger having a first branch wherein a gas and/or steam flow circulates, and a second branch wherein the fluid circulates. Said heat exchanger enables the regulation of the temperature of said gas and/or steam flow.

According to a preferred embodiment, said at least one generation unit comprises a first generation unit, a second generation unit, and a heat exchanger having a first branch in which the gas and/or steam flow generated by the first generation unit circulates, and a second branch in which a gas and/or steam flow generated by the second generation unit circulates. Said heat exchanger enables the recovery of the energy from the gas and/or steam flow generated by the second generation unit and that has passed through the treatment compartment.

In this way, each generation unit can communicate with the thermal circuit or with another generation unit by means of heat exchangers, in such a way as to regulate the temperature of the gas and/or steam flow.

According to an exemplary embodiment, the system comprises a control system configured for controlling the heat exchanger between a generation unit and the thermal circuit, and/or the heat exchanger between a first generation unit and a second generation unit, in order to regulate the temperature of the gas and/or steam flow generated by said generation unit.

According to an exemplary embodiment, the system further comprises a fan arranged in the first branch of the heat exchanger, and a valve connected between said first branch and a fresh air inlet. The control system is configured for controlling the fan and/or the valve.

As described above, the temperature of the gas and/or steam flow of each generation unit is regulated by means of heat exchangers. The speed and composition of these flows are respectively regulated by the use of fans and adjustable valves.

According to a preferred embodiment, said at least one generation unit comprises a first generation unit and a second generation unit. The first generation unit is configured for directly using, that is to say without recourse to a heat exchanger, at least a portion of the gas and/or steam flow generated by the second generation unit, preferably a generation unit downstream of said first generation unit, and that has passed through the treatment compartment, for generating its own gas and/or steam flow.

Thus, not only energy but also material can be transferred from one generation unit to another.

According to an exemplary embodiment, the first generation unit comprises a valve configured for regulating the gas and/or steam flow from the second generation unit to the first generation unit. The system further comprises a control system configured for controlling said valve in order to regulate the temperature and/or the composition of the gas and/or steam flow generated by the first generation unit.

This valve enables regulation of the portion of the flow coming from the second generation unit that is redirected to the first generation unit.

According to a preferred embodiment, the roasting device comprises a transport system configured for transporting a layer of particulate material through the treatment compartment comprising a first zone, one or more intermediate zones and a last zone such that the particulate material consecutively passes through the first zone, the intermediate zones, and the last zone.

The existing solution for roasting particulate material is the use of the batch or discontinuous method, in which the particulate material is shaken in a rotary drum while hot air is blown through it. This method produces batches of roasted material at regular intervals. The advantages of transporting a layer of particulate material, thus enabling continuous operation, through a treatment compartment comprising several zones, are the reduction in the amount of mechanical energy to be supplied during roasting as well as the possibility of operating at lower temperatures that can be adjusted in such a way as to obtain an optimal roasting, thus obtaining a better quality roasted material. Although the roasting method using a treatment compartment comprising several zones is the preferred method according to the purpose of the embodiments of the invention, the use of one or more rotary drums combined with a photovoltaic unit and a heat storage device can be considered. As these two methods do not operate in the same range of temperatures, different configurations and operating regimes can be considered for the production and storage of heat. The use of a roasting device comprising at least one fluidised bed of particulate material combined with a photovoltaic unit and a heat storage device can also be considered. Said at least one fluidised bed can be produced by directing a vertically ascending gas and/or steam flow towards the particulate material to be roasted. As said methods involving one or more rotary drums or at least one fluidised bed of particulate material do not operate continuously, different configurations and operating regimes can be considered for the production and storage of heat, in particular a heat storage device of larger volume can be envisaged.

According to an exemplary embodiment, the transport system comprises feeding means configured for feeding the particulate material such that the layer has a thickness which comprises not more than 10 particles of the particulate material, such as beans, preferably not more than 3 particles, more preferably not more than 2 particles.

In this way, the determination of the maximum height of the layer of particulate material, that is to say the number of particles that can be superimposed without these particles adhering to each other, ensures a uniform temperature inside all the particles. By providing for a thin layer, it is easier to make the temperature inside the particles more uniform.

According to a preferred embodiment, said at least one generation unit comprises: a first generation unit configured for generating a first gas and/or steam flow through the first zone; one or more intermediate generation units configured for generating one or more intermediate gas and/or steam flows through the one or more intermediate zones; a last generation unit configured for generating a last gas and/or steam flow through the last zone; a control system configured for controlling the first generation unit, the one or more intermediate generation units, and the last generation unit, such that the layer of particulate material is preheated and dried in the first zone, roasted in the one or more intermediate zones, and cooled in the last zone.

Thus, this roasting device is divided into different zones, where each zone has a different temperature in order to reach in each zone a certain predetermined temperature inside the particulate material, the heating being achieved by gas and/or steam.

According to an exemplary embodiment, the control system is configured for using at least a portion of the gas and/or steam flow that has passed through one of the zones for generating the gas and/or steam flow of another zone, preferably of a zone upstream of said zone.

This heat recovery and recirculation system enables the reduction of both the thermal energy consumption and the level of gas and/or steam emissions to the outside. The use of at least a portion of the gas and/or steam flow that has passed through a zone downstream of the zone that recovers this flow has the advantage that the latter is at a higher temperature. Thus, the amount of heat recovered is greater.

BRIEF DESCRIPTION OF THE FIGURES

Embodiments of the invention will be described below in more detail, with reference to the accompanying drawings. In the drawings, identical reference numbers correspond to identical or similar features.

DESCRIPTION OF THE EMBODIMENTS

Figure 1:
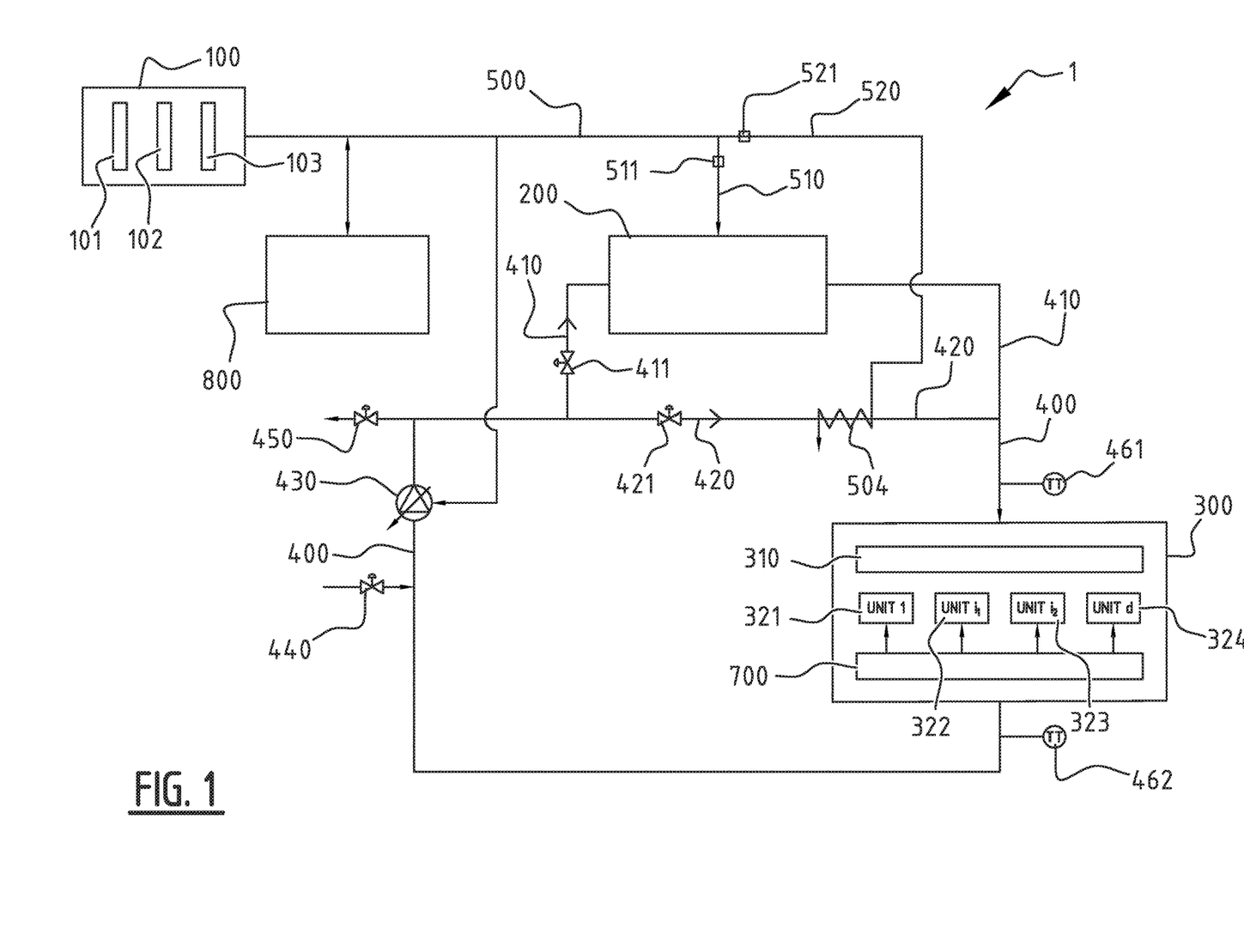
FIG. 1 illustrates a schematic view of an exemplary embodiment of a roasting system according to the invention.

FIG. 1 schematically illustrates an exemplary embodiment of a roasting system according to the present invention.

In the exemplary embodiment illustrated in FIG. 1, the system 1 for roasting particulate material, such as coffee or cacao beans, grains, malt, comprises a photovoltaic unit 100 configured for generating electricity from solar radiation, a heat storage device 200 comprising at least one phase change material (see FIG. 4), a roasting device 300 configured for roasting the particulate material P, a thermal circuit 400 connecting the heat storage device 200 to the roasting device 300 and configured for circulating a fluid F1 through the roasting device 300, and an electrical circuit 500 connecting the photovoltaic unit 100 to the heat storage device 200 and configured for exchanging heat with said at least one phase change material.

The photovoltaic unit 100 comprises three photovoltaic panels 101, 102, 103 arranged in parallel, but the person skilled in the art will understand that the number and/or the arrangement (in series or in parallel) of the photovoltaic panels included in the photovoltaic unit 100 can vary.

The heat storage device 200 is based on the use of one or more phase change materials capable of storing and releasing thermal energy, and comprising for example organic materials such as paraffin or fatty acids, potassium-acetate or sodium-acetate combination, eutectic mixture of molten salts such as potassium chloride and lithium bromide, metals and their alloys, hydrated salts, or a combination of the aforementioned materials.

The roasting device 300 comprises a treatment compartment 310 configured for receiving the particulate material P, as well as four generation units 321, 322, 323, 324 configured for generating four gas and/or steam flows with controlled temperatures, through the treatment compartment 310. At least one of the generation units 321, 322, 323, 324, preferably each generation unit, is configured for exchanging heat between the gas and/or steam flow that it generates and the fluid F1. At least one of the four generation units 321, 322, 323, 324, preferably each generation unit, can be configured for exchanging heat between the fluid F1 and the gas and/or steam flow that it generates (see FIG. 6A), or for directly using the fluid F1, that is to say without recourse to an intermediate heat exchanger, for generating the gas and/or steam flow that it generates (see FIG. 6B). The fluid F1 can be in the form of gas and/or steam, in particular in the embodiment of FIG. 6B, but the person skilled in the art will understand that another fluid with a similar calorific capacity can be used.

The roasting device 300 comprises four generation units 321, 322, 323, 324, but the person skilled in the art will understand that their number can vary. In addition, the treatment compartment 310 can comprise a transport system 330 configured for transporting a layer L of particulate material P, or else a system of rotary drums. Thus, the roasting of particulate material P can operate continuously or discontinuously. Finally, the roasting device 300 comprises a control system 700 configured for regulating the temperature and/or the composition and/or the speed of the gas and/or steam flows generated by the generation units.

The thermal circuit 400 comprises a first thermal branch 410 passing through the heat storage device 200. The electrical circuit 500 comprises at least one electrical resistance (see FIG. 3) in thermal contact with said at least one phase change material, and a first electrical branch 510 connecting the photovoltaic unit 100 to said at least one electrical resistance. The thermal circuit 400 further comprises a second thermal branch 420 parallel to the first thermal branch 410. The electrical circuit 500 further comprises at least one electrical resistance 504 in contact with the second thermal branch 420, and a second electrical branch 520 parallel to the first electrical branch 510 and connecting the photovoltaic unit 100 to said at least one electrical resistance 504. In other embodiments, the second electrical branch 520 can be in series with the first electrical branch 510.

During the day, for example over a period of 12 hours, the photovoltaic unit 100 can be configured for producing electrical energy corresponding to 100% of the energy consumed in 24 hours by the roasting system 1. This energy consumed by the roasting system 1 includes both the electrical energy consumed by the electrical devices of the system 1 and the thermal energy consumed by the thermal devices of the system 1.

A portion of the electrical energy produced by the photovoltaic unit 100 during the day, for example 5% of this electrical energy, is consumed by the electrical devices of the system 1. This can be a pump unit 430 configured for pumping the fluid F1 and circulating it in the thermal circuit 400, or fans configured for regulating the speed of the fluid F1 inside the thermal circuit 400 or for regulating the speed of the gas and/or steam flows generated by the generation units 321, 322, 323, 324, or even electronic components of the system 1 such as various components of the control system 700 or of an external control system.

Another portion of the electrical energy produced by the photovoltaic unit 100 during the day, for example 45% of this electrical energy, is consumed by the electrical resistance 504 in contact with the second thermal branch 420 in such a way as to heat by Joule effect the fluid F1 circulating in the thermal circuit 400. As mentioned above, the fluid F1 can exchange heat with at least one of the gas and/or steam flows generated by the generation units 321, 322, 323, 324, or can be directly used for generating at least one of said gas and/or steam flows. The electrical current circulating in the electrical resistance 504 is regulated so that the temperature of the fluid F1 required by the generation units 321, 322, 323, 324 is obtained just upstream of the roasting device 300 in the circulation direction of the fluid F1, at the temperature sensor 461, or just downstream of the roasting device 300 in the circulation direction of the fluid F1, at the temperature sensor 462. The electrical current circulating in the electrical resistance 504 can be regulated by the control system 700 of the generation units 321, 322, 323, 324, or by an external control system.

The excess electrical energy produced by the photovoltaic unit 100 during the day, i.e. 50% of this electrical energy in the above example, can be stored in an electrical battery 800, (for example, 5% of this electrical energy), and in the heat storage device 200, (for example, 45% of this electrical energy). In other embodiments, all of the excess electrical energy produced by the photovoltaic unit 100 during the day can be stored in the heat storage device 200, i.e. 50% of this electrical energy. Said at least one phase change material of the heat storage device 200 is in contact with said at least one electrical resistance of the first electrical branch 510.

During the day, said at least one electrical resistance can melt said at least one phase change material by consuming the 45% surplus of electrical energy produced by the photovoltaic unit 100 during the day. Thus, the heat storage device 200 enables the transformation of the electrical energy into thermal energy, that is stored in said at least one phase change material.

The electrical circuit 500 can comprise control means, such as switches 511, 521, configured for controlling the flow of the electricity generated by the photovoltaic unit 100 in the first electrical branch 510 and in the second electrical branch 520. The first switch 511 is arranged on the first electrical branch 510 and the second switch 521 is arranged on the second electrical branch 520. In embodiments where the second electrical branch 520 is in series with the first electrical branch 510, switches can be arranged in such a way that the electricity generated by the photovoltaic unit 100 can flow only in the first electrical branch 510, or only in the second electrical branch 520, or else at the same time in the first electrical branch 510 and in the second electrical branch 520.

The thermal circuit 400 can comprise control means, such as valves 411, 421, configured for controlling the flow of the fluid F1 in the first thermal branch 410 and in the second thermal branch 420. The first valve 411 is arranged on the first thermal branch 410 and the second valve 421 is arranged on the second thermal branch 420.

When the photovoltaic unit 100 no longer produces enough electrical energy to supply said at least one electrical resistance 504 in contact with the second thermal branch 420, for example during twilight or when the sunlight is weak, the two valves 411, 421 can be used to direct a portion of the fluid F1 to the heat storage device 200. Thus, the valves 411, 421 can help said at least one electrical resistance 504 to maintain the temperature of the fluid F1 required at the temperature sensor 461 or at the temperature sensor 462 without consuming an excessive amount of thermal energy stored in the heat storage device 200.

During the night, for example over a period of 12 hours, the heat storage device 200 can be discharged of its stored thermal energy by circulating a cold fluid F1 in the first thermal branch 410 in such a way as to heat by thermal exchange the fluid F1 circulating in the thermal circuit 400. Thus, the valve 421 is closed as there is no longer any electrical energy available for supplying said at least one electrical resistance in contact with the second thermal branch 420, the valve 411 is open as there is thermal energy available inside said at least one phase change material, and all the fluid F1 circulates in the first thermal branch 410 through the heat storage device 200.

When the photovoltaic unit 100 again produces enough electrical energy for supplying said at least one electrical resistance 504 in contact with the second thermal branch 420, for example at dawn or when the sunlight is stronger, the two valves 411, 421 redirect the fluid F1 increasingly to the second thermal branch 420. At full electrical power delivered by the photovoltaic unit 100, the valve 411 can be completely closed.

In addition, the valves 440, 450 enable the regulation of the humidity level of the fluid F1. The valve 440 located upstream of the roasting device 300 in the circulation direction of the fluid F1 can enable fresh air to be injected into the thermal circuit 400. The valve 450 located downstream of the roasting device 300 can enable excess air to be ejected from the thermal circuit 400. The opening of the valves 440, 450 can be regulated by the control system 700 of the generation units 321, 322, 323, 324, or by an external control system (not shown), and may require a supply of electrical energy from the photovoltaic unit 100.

During the night, or when the sunlight is weak, the electrical battery 800 can release the stored electrical energy coming from the 5% surplus of electrical energy produced by the photovoltaic unit 100 during the day. This released electrical energy can be used to supply the aforementioned electrical devices of the roasting system 1.

Preferably, the photovoltaic unit 100 and the heat storage device 200 are configured for operating in a range of temperatures between 150° C. and 350° C., preferably between 200° C. and 300° C. This range of temperatures corresponds to obtaining a quality of particulate material comparable to that obtained with a traditional roasting method, at the same time enabling the reduction of energy consumption.

The heat storage device 200, the roasting device 300 and the thermal circuit 400 can form a substantially closed system, so that there is substantially no leakage of thermal energy from the substantially closed system. Thus, this enables both the reduction of energy consumption and of the level of emissions of roasting gas and/or steam to the outside of the system 1.

Figure 2:
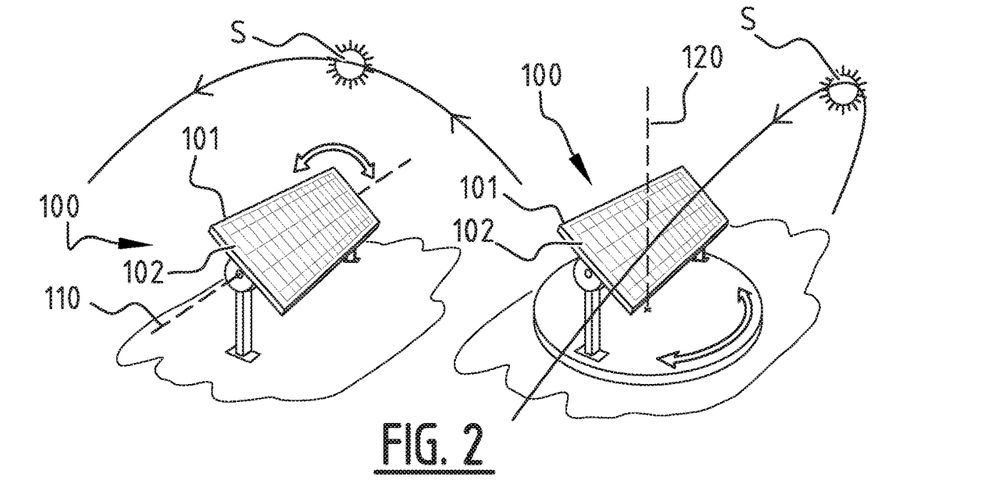
FIG. 2 illustrates a schematic view of an exemplary embodiment of a photovoltaic unit according to the invention.

FIG. 2 schematically illustrates an exemplary embodiment of a photovoltaic unit according to the invention.

In the exemplary embodiment illustrated in FIG. 2, the photovoltaic unit 100 comprises a photovoltaic panel 101. The photovoltaic panel 101 is composed of photovoltaic cells 102 that use the photoelectric effect to convert electromagnetic waves (radiation) emitted by the Sun into electricity. Several photovoltaic cells 102 connected together form a photovoltaic panel 101, and several photovoltaic panels 101 grouped together form a photovoltaic unit 100. The electricity produced by the photovoltaic unit 100 is either used or stored on site, or transmitted through an electrical distribution and transmission network. In the context of the invention, all of the electrical energy produced by the photovoltaic unit can be used by the roasting system.

The photovoltaic panel 101 can be orientated according to the direction of the incident light rays. The inclination of the photovoltaic panel 101 can operate relative to a horizontal axis of rotation 110, and the orientation of the photovoltaic panel 101 can operate relative to a vertical axis of rotation 120, according to the direction of the incident light rays coming from the Sun S. This enables the optimisation of electricity production from the photovoltaic panel 101. In order to reduce the cost associated with inclining and orientating each photovoltaic panel 101 individually, the photovoltaic panels 101 can be grouped in series and/or parallel to form a photovoltaic unit 100 organised in a bi-dimensional network, and thus incline and orientate themselves in a synchronised way.

Figure 3:
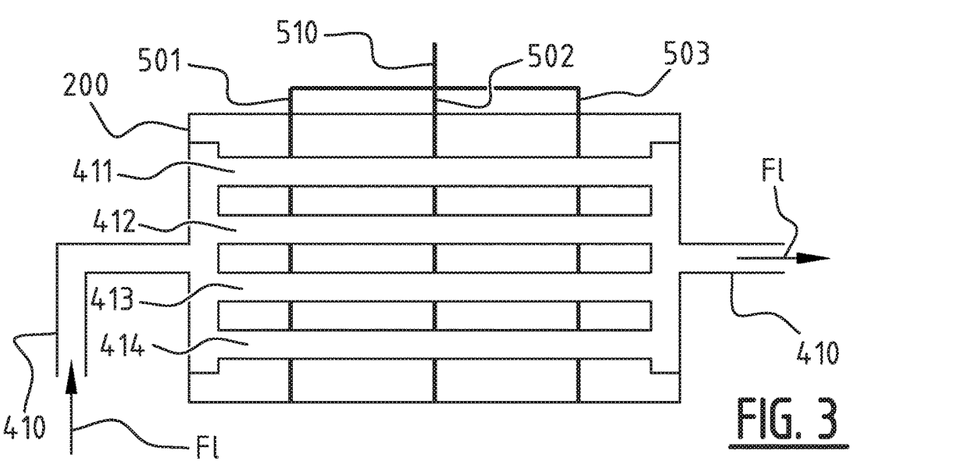
FIG. 3 illustrates a schematic view of an exemplary embodiment of the interface between the first electrical branch and the heat storage device according to the invention.

FIG. 3 schematically illustrates an exemplary embodiment of the interface between the first electrical branch and the heat storage device according to the invention.

In the exemplary embodiment illustrated in FIG. 3, the photovoltaic unit 100 and the heat storage device 200 communicate via the first electrical branch 510 of the electrical circuit 500. The heat storage device 200 comprises at least one phase change material. The first electrical branch 510 is connected to three electrical resistances 501, 502, 503 arranged in parallel and in thermal contact with said at least one phase change material. The person skilled in the art will understand that the number of electrical resistances can vary in other embodiments, and/or that these electrical resistances can be arranged in series. In the event of direct thermal contact with said at least one phase change material, the three electrical resistances 501, 502, 503 can each comprise a protective sheath (not shown) that surrounds them and is made of a heat conductive material, said sheath being in direct thermal contact with said at least one phase change material.

During the day, the three electrical resistances 501, 502, 503 can melt said at least one phase change material by consuming a portion of the excess electrical energy produced by the photovoltaic unit 100. Thus, the heat storage device 200 enables the transformation of electrical energy into thermal energy, that is stored in said at least one phase-change material 201, 202, 203. The three electrical resistances 501, 502, 503 can be provided with fins on their external surface for optimising the thermal exchange with said at least one phase change material.

During the night, or when the sunlight is weak, the heat storage device 200 can be discharged at least partially of its stored thermal energy by circulating a cold fluid F1 in the first thermal branch 410, in such a way as to heat it by thermal exchange. Thus, at least a portion of the fluid F1 circulates in the first thermal branch 410 through the heat storage device 200. Inside the heat storage device 200, the first thermal branch 410 can branch out into several thermal sub-branches 411, 412, 413, 414 arranged in parallel in order to increase the heat exchange between said at least one phase change material and the thermal sub-branches 411, 412, 413, 414. The thermal sun-branches 411, 412, 413, 414 can be provided with fins on their external surface for optimising the thermal exchange with said at least one phase change material. The person skilled in the art will understand that in other embodiments the thermal sub-branches 411, 412, 413, 414 can be replaced by the use of a coil inside the heat storage device 200 in order to increase the heat exchange between said at least one phase change material and the coil.

Figure 4:
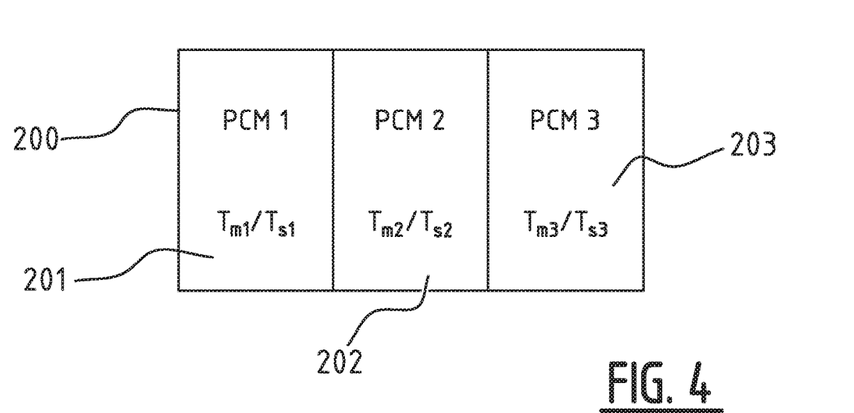
FIG. 4 illustrates a schematic view of an exemplary embodiment of a heat storage device according to the invention.

FIG. 4 schematically illustrates an exemplary embodiment of a heat storage device according to the invention.

In the exemplary embodiment illustrated in FIG. 4, the fluid F1 circulating in the first thermal branch 410 of the thermal circuit 400 enters the heat storage device 200, in order to be heated there by thermal exchange with one or more phase change materials. The heat storage device 200 comprises three distinct layers 201, 202, 203, corresponding to three different phase change materials PCM1, PCM2, PCM3, that have different melting temperatures Tm1, Tm2, Tm3. The person skilled in the art will understand that their number can vary, and that some materials can be identical. Preferably, the melting temperature of a material located upstream in the circulation direction of the fluid F1 in the first thermal branch 410 is lower than the melting temperature of a material located downstream in said circulation direction of the fluid F1. Also preferably, the solidification temperature of a material located upstream is lower than the solidification temperature of a material located downstream. For example, the melting temperature Tm1 can be between 150° C. and 250° C., the melting temperature Tm2 can be between 250° C. and 350° C., and the melting temperature Tm3 can be between 350° C. and 450° C. These ranges of temperature are compatible with the ranges of temperature of the traditional roasting method.

Thus, if the incident light intensity is weak, at least a portion of the heat storage device 200 is in the liquid state and enables the release of energy needed by the roasting device 300. This configuration involving different phase change materials arranged in layers has a volumetric energy efficiency greater than a configuration involving only a single phase change material.

However, adding heat conductive materials such as graphite or metals inside the one or more phase change materials enables an increase of the thermal conductivity of the latter. The modelling calculations should also take into account any overlap in the values of the melting temperatures Tm1, Tm2, Tm3 and of the solidification temperatures Ts1, Ts2, Ts3 of the phase change materials PCM1, PCM2, PCM3.

As illustrated in FIGS. 3 and 4, each of the three resistances 501, 502, 503 can be in contact with a respective phase change material PCM1, PCM2, PCM3. Thus, the resistance 501 can be associated with the material PCM1, the resistance 502 can be associated with the material PCM2, and the resistance 503 can be associated with the material PCM3. The electrical current circulating in each of the electrical resistances 501, 502, 503 can be adapted to the melting temperature Tm1, Tm2, Tm3 and/or solidification temperature Ts1, Ts2, Ts3 of the respective phase change materials PCM1, PCM2, PCM3. Thus, in the case where the melting temperature of a material located upstream is lower than the melting temperature of a material located downstream, the current circulating in the electrical resistance associated with the upstream material will have a lower intensity than the current circulating in the electrical resistance associated with the downstream material. The same is true for the solidification temperatures of the upstream and downstream materials.

Figure 5:
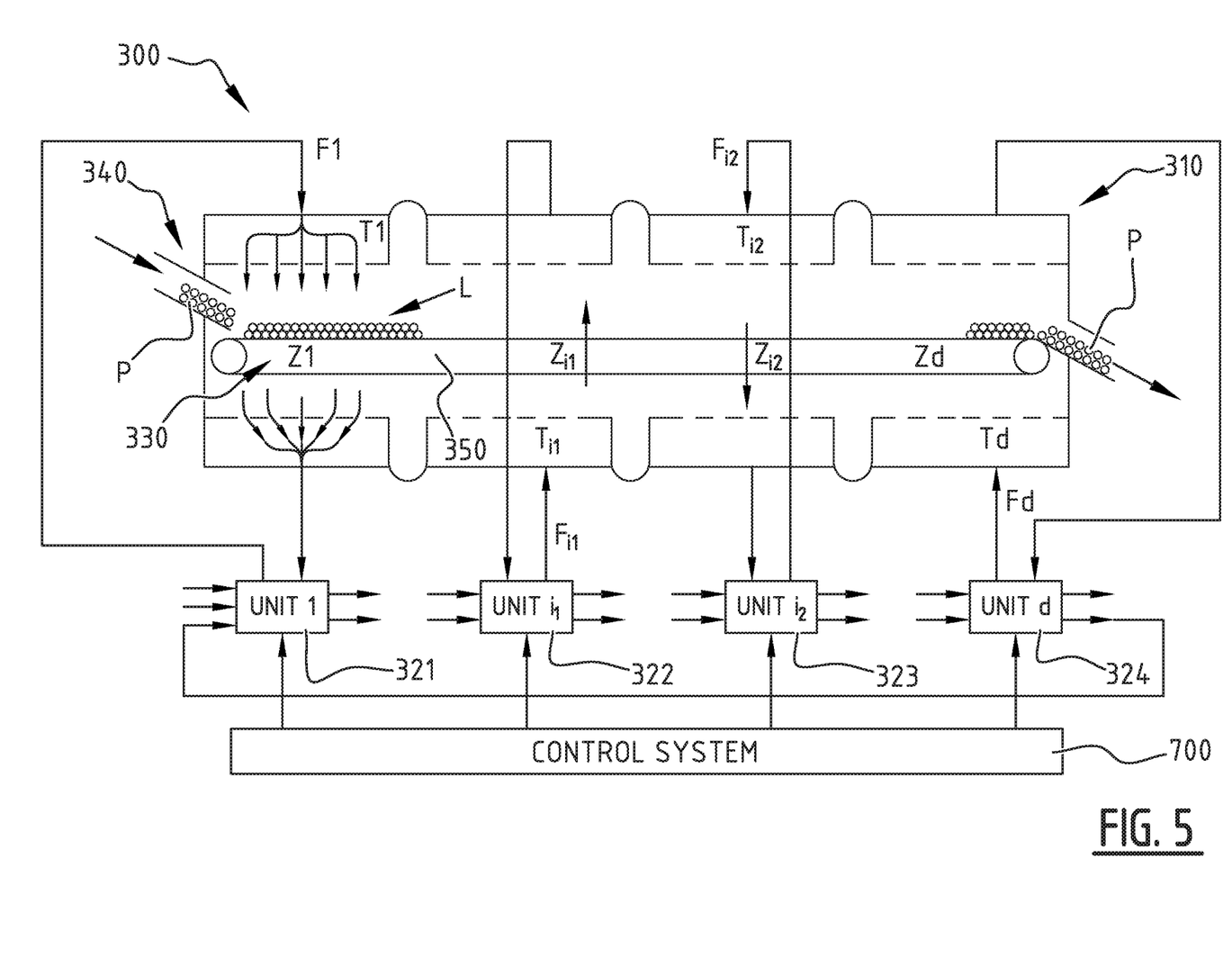
FIG. 5 illustrates a schematic view of an exemplary embodiment of a continuous particulate material roasting device according to the invention.

FIG. 5 schematically illustrates an exemplary embodiment of a continuous particulate material roasting device according to the invention.

In the exemplary embodiment illustrated in FIG. 5, the continuous roasting device 300 comprises a treatment compartment 310, a transport system 330, a first fluid generation unit 321, two intermediate fluid generation units 322, 323, a last fluid generation unit 324, as well as a control system 700. The treatment compartment 310 is composed of a first zone Z1, two intermediate zones Zi1, Zi2, and a last zone Zd. The transport system 330 is configured for transporting a layer L of particulate material P through the treatment compartment 310, so that the particulate material P passes consecutively through the first zone Z1, the two intermediate zones Zi1, Zi2, and the last zone Zd. The person skilled in the art will understand that the number and length of each zone can vary. Thus, each zone can have its own length, and the treatment compartment 310 can comprise more than two intermediate zones.

The transport system 330 comprises feeding means 340 configured for feeding the particulate material P, without introducing environmental air, so that the layer L has a thickness comprising not more than 10 particles of particulate material, such as coffee or cacao beans, grains, malt, i.e. a thickness of less than 100 mm, preferably not more than 3 particles, i.e. a thickness less than 20 mm, and more preferably with not more than 2 particles, i.e. a thickness less than 15 mm. In addition, the transport system 330 comprises a conveyor belt 350 with a substantially flat surface that supports the layer L of particulate material P. The conveyor belt 350 passes through the first zone Z1, the two intermediate zones Zi1, Zi2, and the last zone Zd. The mechanical energy necessary for moving the conveyor belt 350 can be supplied by electricity generated by the photovoltaic unit 100 or by the electrical battery 800 of FIG. 1.

The first fluid generation unit 321 is configured for generating a first gas and/or steam flow F1 through the first zone Z1, the two intermediate fluid generation units 322, 323 are configured for generating two intermediate gas and/or steam flows Fi1, Fi2 through the intermediate zones Zi1, Zi2, and the last fluid generation unit 324 is configured for generating a last gas and/or steam flow Fd through the last zone Zd. The conveyor belt 350 is configured for enabling the first gas and/or steam flow F1, the two intermediate gas and/or steam flows Fi1, Fi2 and the last gas and/or steam flow Fd to pass through the layer L of particulate material P that it supports. For example, the conveyor belt 350 can comprise openings in the manner of a perforated belt, or else can be made of porous material, thus enabling the gas and/or steam flows to pass through. The control system 700 is configured for using at least a portion of the gas and/or steam flow that has passed through one of the zones Z1, Zi1, Zi2, Zd for generating the gas and/or steam flow of another zone Z1, Zi1, Zi2, Zd, preferably from another zone upstream of said zone.

The control system 700 is configured for controlling the temperature T1 and/or the composition and/or the speed of the first gas and/or steam flow F1, of the two intermediate gas and/or steam flows Fi1, Fi2, and of the last gas and/or steam flow Fd. The temperature T1 is controlled so that it is between 45° C. and 150° C., the temperatures Ti1, Ti2 are controlled so that they are between 150° C. and 350° C., and the temperature Td is controlled so that it is between 10° C. and 100° C. The relative humidity of the two intermediate gas and/or steam flows Fi1, Fi2 is also controlled. Typically, the temperature Ti1 of the first intermediate zone Zi1 is higher than the temperature T1 of the first zone Z1, and the temperature of an intermediate zone downstream of a given intermediate zone is greater than that of said zone. In addition, typically the temperature Td of the last zone Zd is lower than the temperature T1 of the first zone Z1.

Figure 6A:
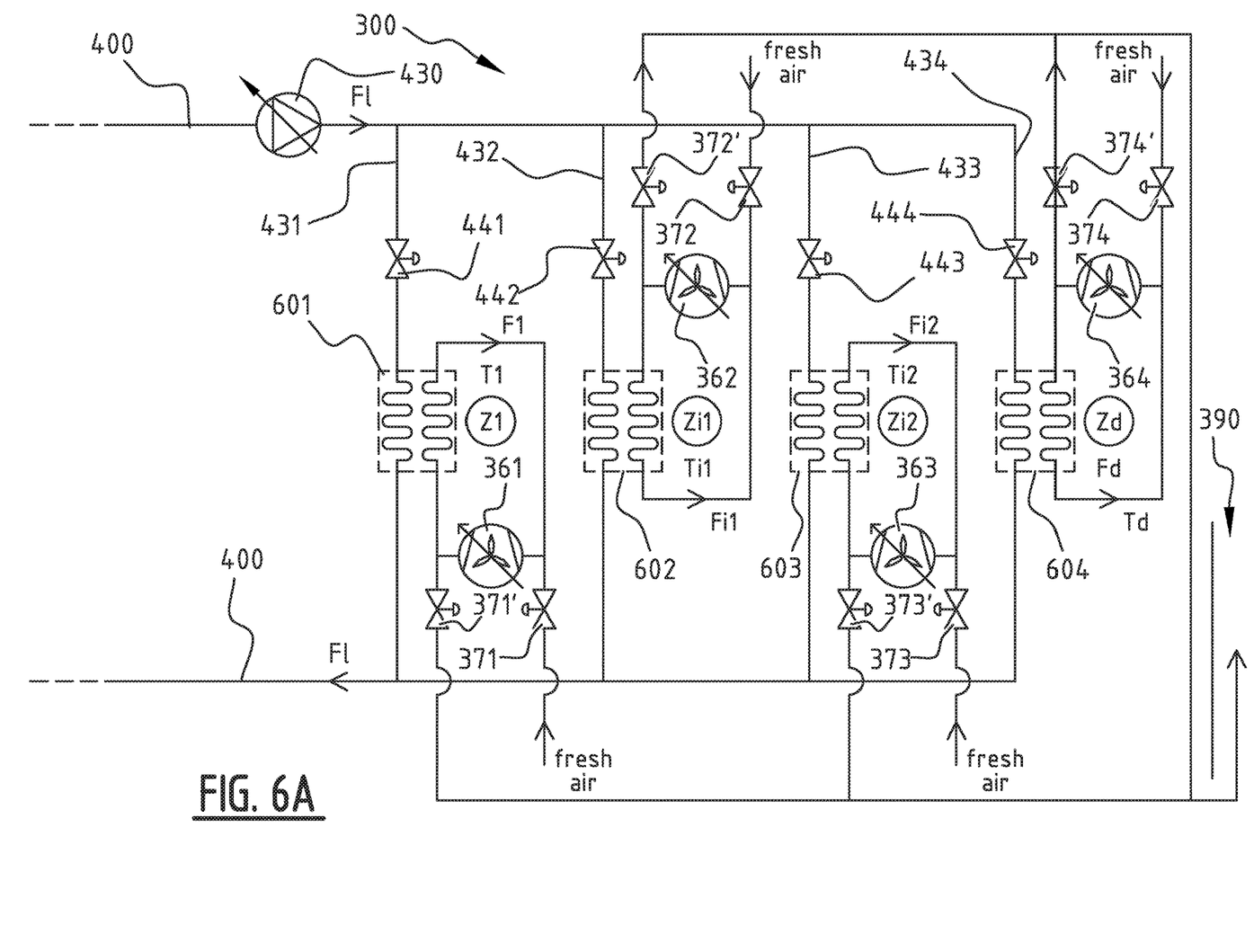
FIG. 6A illustrates a schematic view of an exemplary embodiment of the interface between the thermal circuit and the roasting device according to the invention.

FIG. 6A schematically illustrates an exemplary embodiment of the interface between the thermal circuit and the roasting device according to the invention.

In the exemplary embodiment illustrated in FIG. 6A, the fluid F1 is delivered to the roasting device 300 (not shown in its entirety for the sake of clarity). The latter includes four generation branches 431, 432, 433, 434, four adjustable valves 441, 442, 443, 444, one in each of the four generation branches 431, 432, 433, 434, as well as a pump unit 430 configured for pumping the fluid F1 through the four generation branches 431, 432, 433, 434. The pump unit 430 therefore delivers the fluid F1 to the treatment compartment (not shown for the sake of clarity). The latter comprises a first zone Z1, through which a gas and/or steam flow F1 circulates at a temperature T1, of two intermediate zones Zi1, Zi2 through which the gas and/or steam flows Fi1, Fi2 circulate respectively at temperatures Ti1, Ti2, as well as a last zone Zd through which a gas and/or steam flow Fd circulates at a temperature Td. The person skilled in the art will understand that the number of intermediate zones can vary.

Upstream of the treatment compartment in the circulation direction of the fluid F1 are the four valves 441, 442, 443, 444. The person skilled in the art will understand that these four valves 441, 442, 443, 444 can also be located downstream of the treatment compartment in the circulation direction of the fluid F1. This cascade valve device enabling the regulation of the temperature of the gas and/or steam flow in each of the zones Z1, Zi1, Zi2, Zd enables the use just one pump unit 430. In addition, the pump unit 430 can comprise a pump and a speed governor configured for controlling the speed of the pump. Thus, the pump unit 430 is configured for using a reduced amount of electrical energy for pumping the fluid F1 through the four generation branches 431, 432, 433, 434 of the thermal circuit 400, so that the valves 441, 442, 443, 444 are opened in such a way that the pressure drop is minimised. For regulating these temperatures, the valves 441, 442, 443, 444 can open more and more until reaching for example around 95 percent of the maximum opening capacity. Beyond this value, the pump unit 430 can start to pump more for regulating said temperatures.

The thermal circuit 400 can exchange heat with each of the four zones Z1, Zi1, Zi2, Zd included in the treatment compartment, via heat exchangers 601, 602, 603, 604. Indeed, each of the four generation units (not shown for the sake of clarity), corresponding to each of the four zones Z1, Zi1, Zi2, Zd, is respectively coupled to a branch 431, 432, 433, 434 of the thermal circuit 400. Each of the four generation units, in which the gas and/or steam flows F1, Fi1, Fi2, Fd circulate, comprises an adjustable fan 361, 362, 363, 364 enabling regulation of the speed of said gas and/or steam flows by means of for example a speed governor, as well as an adjustable valve 371, 372, 373, 374 enabling regulation of the humidity level present in the flows F1, Fi1, Fi2, Fd thanks to a fresh air inlet circuit outside the roasting device 300. Finally, a chimney 390 prevents the four generation units 321, 322, 323, 324 from overreacting due to the presence of the fresh air inlet circuits alongside fans 361, 362, 363, 364 and valves 371, 372, 373, 374. Adjustable valves 371', 372', 373', 374' are each located on an exhaust circuit for the used gases and/or steam after contact with the particulate material to be roasted. It should be noted that the inlet flow of fresh air and the exhaust flow of the used gases and/or steam are in balance with the regulation of valves 371, 372, 373, 374 and valves 371', 372', 373', 374'.

Figure 6B:
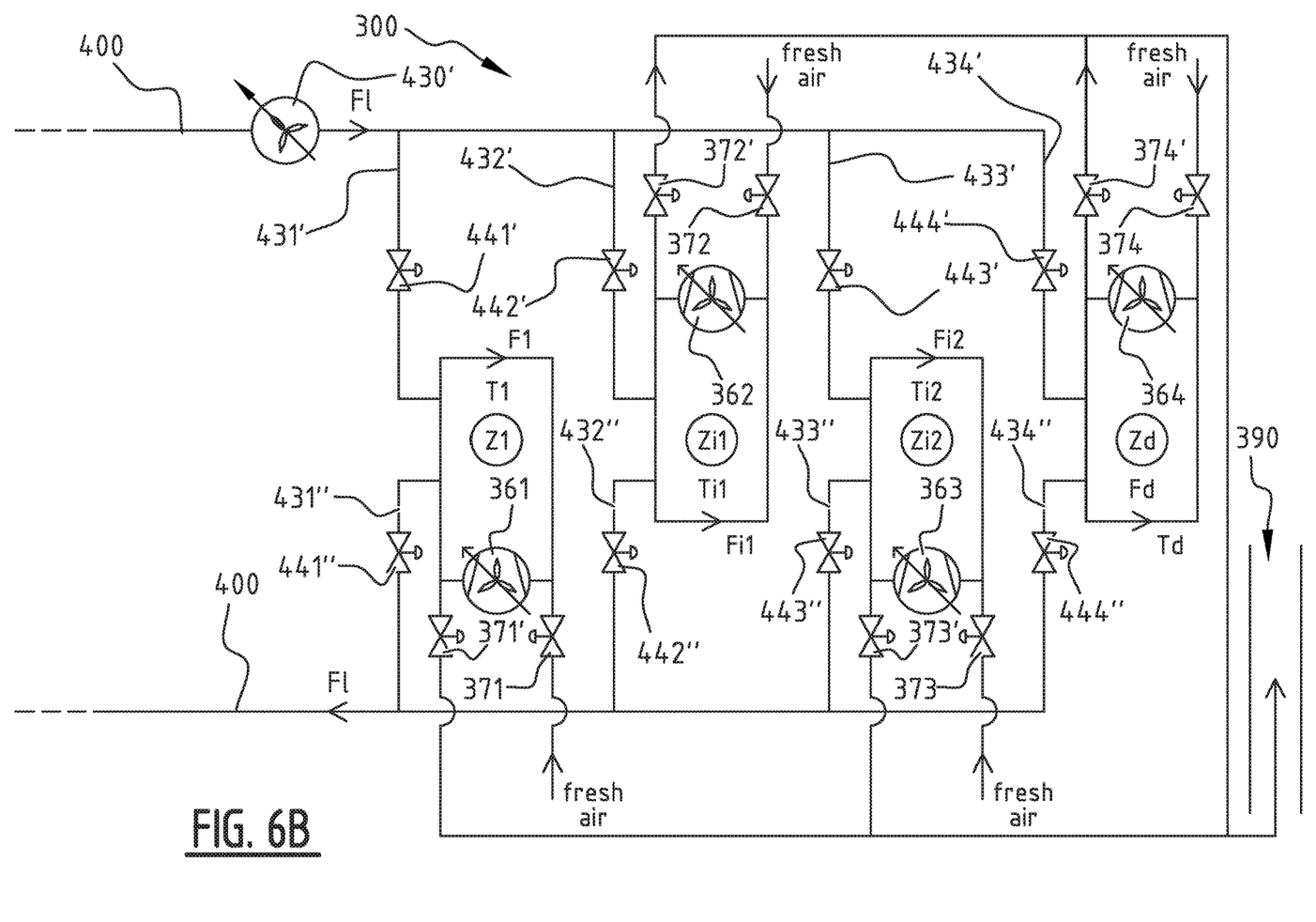
FIG. 6B illustrates a schematic view of another exemplary embodiment of the interface between the thermal circuit and the roasting device according to the invention.

FIG. 6B schematically illustrates another exemplary embodiment of the interface between the thermal circuit and the roasting device according to the invention.

Unlike the embodiment of FIG. 6A where each of the generation units 321, 322, 323, 324 is configured for exchanging heat between the fluid F1 of the thermal circuit 400 and the gas and/or steam flow F1, Fi1, Fi2, Fd that it generates, in the embodiment of FIG. 6B each of the generation units 321, 322, 323, 324 is configured for directly using the fluid F1 to generate the gas and/or steam flow F1, Fi1, Fi2, Fd that it generates. The fluid F1 is therefore in the form of gas and/or steam in order to directly generate said gas and/or steam flows F1, Fi1, Fi2, Fd. So, reference will be made below to "fluid F1" when the gas and/or steam circulates in the thermal circuit 400, and to "gas and/or steam flow F1, Fi1, Fi2, Fd" when this same gas and/or this same steam circulates in the generation units 321, 322, 323, 324, without forgetting that this relates to the same substance. In other words, in the embodiment of FIG. 6B the fluid F1 corresponds to the roasting gases and/or steam of the particulate material inside the roasting device 300. Thus, unlike the embodiment of FIG. 6A in which the fluid F1 can be in the form of gas and/or steam or else in liquid form, such as water or thermal oil, in the embodiment of FIG. 6B the fluid F1 is in the form of gas and/or steam. Therefore, the pump unit 430 of FIG. 6A, that is configured for pumping a liquid in the thermal circuit 400, is replaced by a fan 430' in FIG. 6B, that is configured for circulating a gas and/or a steam in the thermal circuit 400. Likewise, when the fluid F1 is in the form of gas and/or steam in the thermal circuit 400, the pump unit 430 of FIG. 1 is replaced by the fan 430' of FIG. 6B.

In the embodiment of FIG. 6B, each of the generation branches 431, 432, 433, 434 of FIG. 6A is subdivided into a first generation semi-branch 431', 432', 433', 434' and into a second generation semi-branch 431", 432", 433", 434". The first generation semi-branches 431', 432', 433', 434' are each situated between the fan 430' and the generation units 321, 322, 323, 324. The second generation semi-branches 431", 432", 433", 434" are each situated between the generation units 321, 322, 323, 324 and a portion of the thermal circuit 400 situated downstream of the treatment compartment in the circulation direction of the fluid F1.

Adjustable valves 441', 442', 443', 444' are respectively present on the first generation semi-branches 431', 432', 433', 434'. Similarly, adjustable valves 441", 442", 443", 444" are respectively present on the second generation semi-branches 431", 432", 433", 434". A direct connection is located respectively between each of the first generation semi-branches 431', 432', 433', 434' and each of the generation units 321, 322, 323, 324. Similarly, a direct connection is located respectively between each of the second generation semi-branches 431", 432", 433", 434" and each of the generation units 321, 322, 323, 324. These direct connections are situated respectively between the valves 441', 442', 443', 444' and the valves 441", 442", 443", 444".

For the admission of the fluid F1 from a first generation semi-branch 431', 432', 433', 434' to a generation unit 321, 322, 323, 324, the valves 441', 442', 443', 444' are open. For the extraction of the gas and/or steam flow F1, Fi1, Fi2, Fd from a generation unit 321, 322, 323, 324 to a second generation semi-branch 431", 432", 433", 434", the valves 441", 442", 443", 444" are open. The person skilled in the art will understand that the admission of the fluid F1 from a first generation semi-branch 431', 432', 433', 434' to a generation unit 321, 322, 323, 324 can be carried out at the same time as the extraction of the gas and/or steam flow F1, Fi1, Fi2, Fd from a generation unit 321, 322, 323, 324 to a second generation semi-branch 431", 432", 433", 434". Thus, the valves 441', 442', 443', 444' and the valves 441", 442", 443", 444" can be opened simultaneously. It should be noted that the admission flows of fluid F1 and extraction flows of the gases and/or steam F1, Fi1, Fi2, Fd are in balance with the regulation of valves 441', 442', 443', 444' and valves 441", 442", 443", 444".

The person skilled in the art will understand that in other embodiments, each of the generation units can be configured at the same time for exchanging heat and material between the fluid in the thermal circuit and the gas and/or steam flow that it generates.

Figure 7:
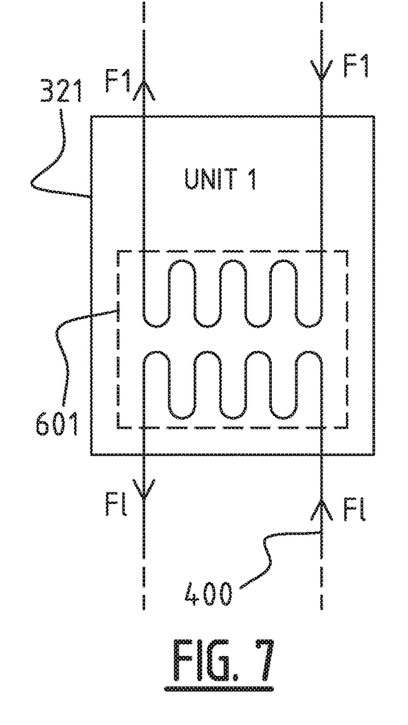
FIG. 7 illustrates a schematic view of an exemplary embodiment of the interface between the thermal circuit and a generation unit of the roasting device according to the invention.

FIG. 7 schematically illustrates an exemplary embodiment of the interface between the thermal circuit and a generation unit of the roasting device according to the invention.

In the exemplary embodiment illustrated in FIG. 7, the first generation unit 321, in which the gas and/or steam flow F1 circulates, communicates with the thermal circuit 400, in which the fluid F1 circulates, by means of the heat exchanger 601. The latter therefore has a first branch in which the gas and/or steam flow F1 circulates, and a second branch in which the fluid F1 that circulates in the thermal circuit 400 circulates. The heat exchanger 601 enables the regulation of the temperature T1 of the flow F1. FIG. 7 therefore zooms in on the heat exchanger associated with zone Z1 that is shown in FIG. 6A. The person skilled in the art will understand that the above description can also apply to one or more other generation units, associated with the other zones Zi1, Zi2, Zd shown in FIG. 6A. In addition, the control system (not shown) is configured for controlling the heat exchanger 601 in order to regulate the temperature and/or the composition and/or the speed of the gas and/or steam flow F1 generated by the first generation unit 321.

Figure 8:
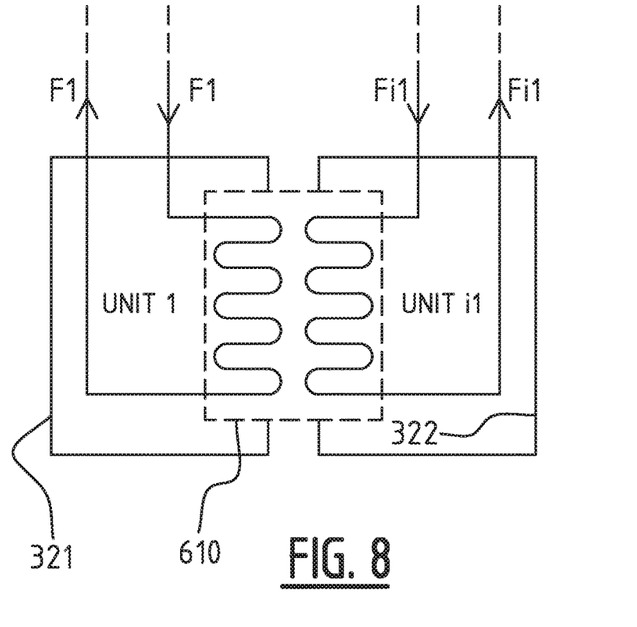
FIG. 8 illustrates a schematic view of an exemplary embodiment of the interface between two generation units of the roasting device according to the invention.

FIG. 8 schematically illustrates an exemplary embodiment of the interface between two generation units of the roasting device according to the invention.

In the exemplary embodiment illustrated in FIG. 8, the first generation unit 321, in which the gas and/or steam flow F1 circulates, communicates with the first intermediate generation unit 322, in which the gas and/or steam flow Fi1 circulates, by means of the heat exchanger 610. The latter therefore has a first branch in which the gas and/or steam flow F1 generated by the first generation unit 321 circulates, and a second branch in which the gas and/or steam flow Fi1 generated by the first intermediate generation unit 322 circulates. The heat exchanger 610 enables the regulation of the temperature T1 and/or the temperature Ti1 of the flow F1 and/or of the flow Fi1. The person skilled in the art will understand that such a heat exchanger can serve as an intermediary between other generation units than the units 321 and 322, and not necessarily between two adjacent generation units. For example, a heat exchanger can be located between the units 321, 323 shown in FIGS. 1 and 5. In addition, the control system (not shown) is configured for controlling the heat exchanger 610 in order to regulate the temperature and/or the composition and/or the speed of the gas and/or steam flow F1 generated by the first generation unit 321.

Figure 9:
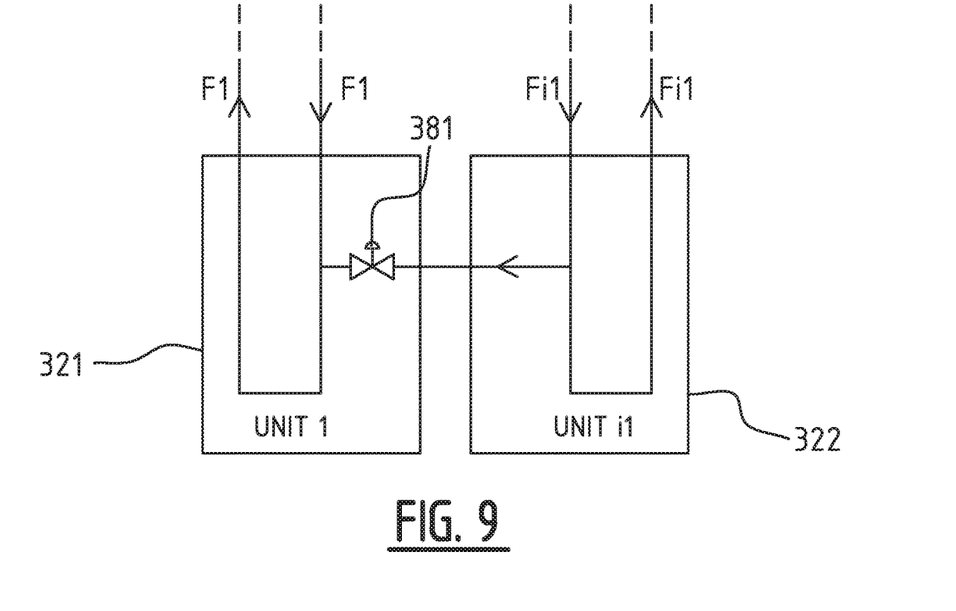
FIG. 9 illustrates a schematic view of another exemplary embodiment of the interface between two generation units of the roasting device according to the invention.

FIG. 9 schematically illustrates another exemplary embodiment of the interface between two generation units of the roasting device according to the invention.

In the exemplary embodiment illustrated in FIG. 9, the first generation unit 321, in which the gas and/or steam flow F1 circulates, communicates directly with the first intermediate generation unit 322, in which the gas and/or steam flow Fi1 circulates, that is to say without recourse to a heat exchanger. Thus, each of the two generation units 321, 322 is configured for directly using at least a portion of the gas and/or steam flow generated by the other generation unit 321 or 322, which is passed through the treatment compartment 310, for generating its own gas and/or steam flow F1 or Fi1. Preferably, the generation unit used to extract at least a portion of the gas and/or steam flow to the other generation unit is located downstream of this other unit. In the case shown in FIG. 9, at least a portion of the flow Fi1, the temperature Ti1 of which is higher than the temperature T1 of the flow F1, is withdrawn to generate the flow F1 of the generation unit 321. Thus, not only energy but also material can be transferred from one generation unit to another. This characteristic distinguishes the exemplary embodiment illustrated in FIG. 9 from that illustrated in FIG. 8. The person skilled in the art will understand that such an exchange of heat and material can be carried out between other generation units than the units 321, 322, and not necessarily between two adjacent generation units. For example, an exchange of heat and material can take place between units 321, 323, preferably from unit 323 to unit 321, as shown in FIGS. 1 and 5. In addition, the generation unit 321 comprises a valve 381 configured for regulating the gas and/or steam flow of the generation unit 322 to the generation unit 321. The control system (not shown) is configured for controlling the valve 381 in order to regulate the temperature and/or the composition and/or the speed of the gas and/or steam flow F1 generated by the generation unit 321.

The invention claimed is:

1. A system for roasting particulate material, said system comprising:
    a photovoltaic unit configured for generating electricity from solar radiation;
    a heat storage device comprising at least one phase change material;
    a roasting device configured for roasting said particulate material;
    a thermal circuit connecting the heat storage device to the roasting device, and configured for circulating a fluid through the roasting device; and
    an electrical circuit connecting the photovoltaic unit to the heat storage device, and configured for exchanging heat with said at least one phase change material;
    wherein the roasting device comprises a treatment compartment configured for receiving the particulate material, at least one generation unit configured for generating at least one gas and/or steam flow with a controlled temperature through the treatment compartment; and
    wherein said at least one generation unit is configured for exchanging heat between the fluid and said at least one gas and/or steam flow or for directly generating said at least one gas and/or steam flow.

2. The system according to claim 1, wherein the electrical circuit comprises at least one first electrical resistance in thermal contact with said at least one phase change material, and a first electrical branch connecting the photovoltaic unit to said at least one first electrical resistance.

3. The system according to claim 1, wherein the thermal circuit comprises a first thermal branch passing through the heat storage device; and wherein the thermal circuit comprises a second thermal branch parallel to the first thermal branch, and the electrical circuit comprises at least one second electrical resistance in contact with the second thermal branch, and a second electrical branch connecting the photovoltaic unit to said at least one second electrical resistance.

4. The system according to claim 1, wherein the fluid is composed of gas and/or steam.

5. The system according to claim 1, further comprising an electrical battery configured for storing a portion of the electricity generated by the photovoltaic unit.

6. The system according to claim 2, wherein said at least one first electrical resistance in thermal contact with said at least one phase change material comprises at least two electrical resistances arranged in parallel or in series; and/or
    wherein the thermal circuit comprises a first thermal branch passing through the heat storage device, and wherein the first thermal branch comprises at least two thermal sub-branches arranged in parallel inside the heat storage device.

7. The system according to claim 2, wherein the thermal circuit comprises a first thermal branch passing through the heat storage device and a second thermal branch parallel to the first thermal branch, and the electrical circuit comprises at least one second electrical resistance in contact with the second thermal branch, and a second electrical branch connecting the photovoltaic unit to said at least one second electrical resistance, and wherein the electrical circuit comprises control means configured for controlling the flow of the electricity generated by the photovoltaic unit in the first electrical branch and in the second electrical branch.

8. The system according to claim 3, wherein the thermal circuit comprises control means configured for controlling the flow of the fluid in the first thermal branch and in the second thermal branch.

9. The system according to claim 2, further comprising an electrical battery configured for storing a portion of the electricity generated by the photovoltaic unit;
    wherein the thermal circuit comprises a first thermal branch passing through the heat storage device and a second thermal branch parallel to the first thermal branch, and the electrical circuit comprises at least one second electrical resistance in contact with the second thermal branch, and a second electrical branch connecting the photovoltaic unit to said at least one second electrical resistance, and
    wherein the system is configured for allocating between 25% and 75% of the electricity generated by the photovoltaic unit to said at least one first electrical resistance in thermal contact with said at least one phase change material, between 25% and 75% of said electricity to said at least one second resistance in contact with the second thermal branch, and between 0% and 10% of said electricity to said electrical battery.

10. The system according to claim 1, wherein the photovoltaic unit and the heat storage device are configured for operating in a range of temperatures between 150° C. and 350° C.

11. The system according to claim 1, wherein the at least one phase change material comprises an upstream material and a downstream material in the circulation direction of the fluid;
wherein the melting temperature of the upstream material is lower than the melting temperature of the downstream material; and/or
wherein the solidification temperature of the upstream material is lower than the solidification temperature of the downstream material.

12. The system according to claim 1, wherein the at least one phase change material comprises one or more of the following materials: potassium-acetate or sodium-acetate combination, eutectic mixture of molten salts such as potassium chloride and lithium bromide, metals and their alloys, and hydrated salts, and organic material including paraffin or fatty acids.

13. The system according to claim 1, wherein the thermal circuit comprises a first generation branch and a second generation branch, a first valve in the first generation branch and a second valve in the second generation branch, and a pump unit configured for pumping the fluid through the first generation branch and the second generation branch; and wherein the at least one generation unit comprises a first generation unit coupled with the first generation branch and a second generation unit coupled with the second generation branch, a first heat exchanger in the first generation unit and a second heat exchanger in the second generation unit.

14. The system according to claim 1, wherein a generation unit of said at least one generation unit comprises a heat exchanger having a first branch wherein a gas and/or steam flow circulates, and a second branch wherein the fluid circulates, said heat exchanger enabling the regulation of the temperature of said gas and/or steam flow.

15. The system according to claim 1, wherein the at least one generation unit comprises a first generation unit, a second generation unit, and a heat exchanger having a first branch in which the gas and/or steam flow generated by the first generation unit circulates, and a second branch in which a gas and/or steam flow generated by the second generation unit circulates, said heat exchanger enabling the recovery of the energy from the gas and/or steam flow generated by the second generation unit and that has passed through the treatment compartment.

16. The system according to claim 14, further comprising a control system configured for controlling said heat exchanger in order to regulate the temperature of the gas and/or steam flow generated by said generation unit, and further comprising a fan arranged in the first branch of said heat exchanger, and a valve connected between said first branch and a fresh air intake; and wherein the control system is configured for controlling the fan and/or the valve.

17. The system according to claim 1, wherein the at least one generation unit comprises a first generation unit and a second generation unit; and
wherein the first generation unit is configured to directly use at least a portion of the gas and/or steam flow generated by the second generation unit, a generation unit downstream of said first generation unit, and that has passed through the treatment compartment, for generating its own gas and/or steam flow; and
wherein the first generation unit comprises a valve configured for regulating the gas and/or steam flow from the second generation unit to the first generation unit; and further comprising a control system configured for controlling said valve to regulate the temperature and/or the composition of the gas and/or steam flow generated by the first generation unit.

18. The system according to claim 1, wherein the roasting device comprises a transport system configured for transporting a layer of particulate material through the treatment compartment comprising a first zone, one or more intermediate zones and a last zone such that the particulate material consecutively passes through the first zone, the one or more intermediate zones, and the last zone; and
wherein the transport system comprises feeding means configured for feeding the particulate material such that the layer has a thickness which comprises not more than 5 particles of the particulate material.

19. The system according to claim 1, wherein said at least one generation unit comprises: a first generation unit configured for generating a first gas and/or steam flow through the first zone; one or more intermediate generation units configured for generating one or more intermediate gas and/or steam flows through the one or more intermediate zones; a last generation unit configured for generating a last gas and/or steam flow through the last zone; a control system configured for controlling said first generation unit, said one or more intermediate generation units, and said last generation unit, such that the layer of particulate material is preheated and dried in the first zone, roasted in the one or more intermediate zones, and cooled in the last zone; and
wherein the control system is configured for using at least a portion of the gas and/or steam flow that has passed through one of the zones for generating the gas and/or steam flow of another zone upstream of said zone.

* * * * *